R. BEMAN.
OPTICAL CHECKING APPARATUS.
APPLICATION FILED JAN. 23, 1917.
1,401,664. Patented Dec. 27, 1921.
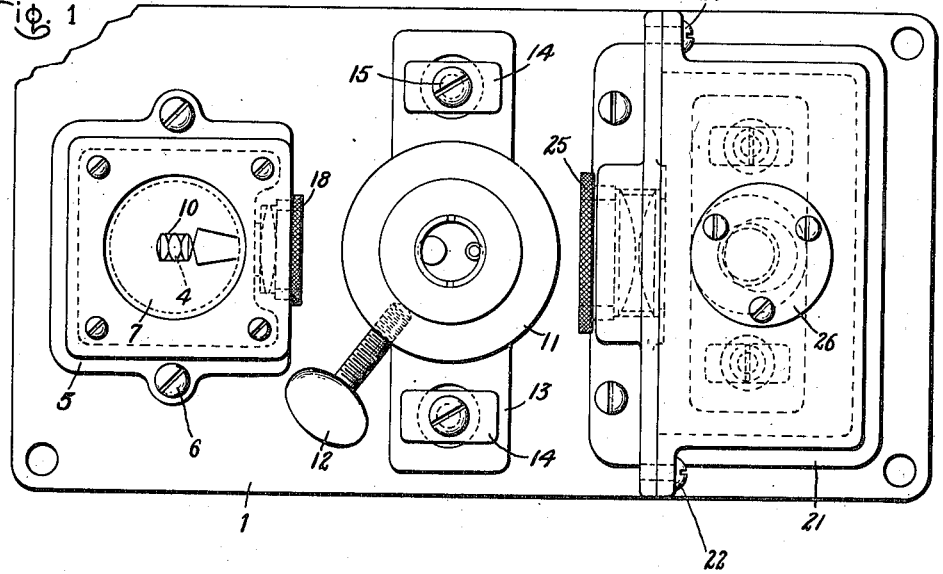
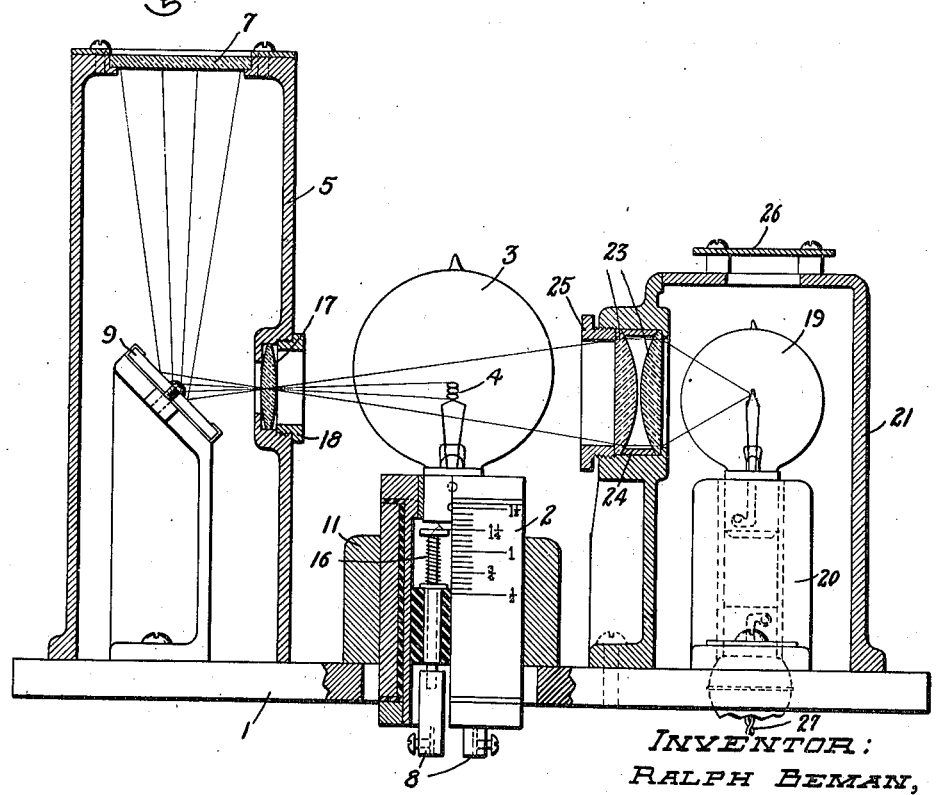
INVENTOR:
RALPH BEMAN,
BY Albert G. Davis
HIS ATTORNEY.

UNITED STATES PATENT OFFICE.

RALPH BEMAN, OF CLEVELAND, OHIO, ASSIGNOR TO GENERAL ELECTRIC COMPANY, A CORPORATION OF NEW YORK.

OPTICAL CHECKING APPARATUS.

1,401,664.

Specification of Letters Patent.   Patented Dec. 27, 1921.

Application filed January 23, 1917. Serial No. 144,042.

*To all whom it may concern:*

Be it known that I, RALPH BEMAN, a citizen of the United States, residing at Cleveland, in the county of Cuyahoga, State of Ohio, have invented certain new and useful Improvements in Optical Checking Apparatus, of which the following is a specification.

My invention relates to the testing of electrical devices, and more particularly to testing the position of elements contained in closed containers, and is of particular importance in testing transparent bulbs containing glowers, as for instance electric incandescent filament lamps.

In the manufacture of incandescent lamps for projection purposes, as for instance, miniature lamps used in headlamps for vehicles, it is necessary that the more or less concentrated filaments of the lamps be accurately positioned and alined in the bulbs in order that the filaments may be correctly located with reference to the focal points of the reflectors when placed in use. It often happens, however, notwithstanding the great care used in centering these filaments in the bulb that the filaments are displaced from their normal or correct position beyond the maximum displacement allowed. It is necessary, therefore, that the lamps be tested and the faulty ones be assorted out and separated from the lamps coming within the requirements. The object of my invention is an apparatus whereby the operator can with ease and facility test out the lamps for the inaccurate location of the filaments and assort the non-acceptable lamps from the accurately positioned lamps. The apparatus is also provided with easily manipulated adjustable devices whereby it may be accurately adjusted for testing various sizes and types of lamps.

For a better understanding of my invention reference may be had to the drawings forming a part of this application, in which Figure 1 is a plan view of my apparatus and Fig. 2 is a part side view and part sectional view thereof.

Referring to the drawings, the apparatus as a whole is mounted on a base 1 and near the middle of the supporting base is disposed a socket 2 adapted to receive a lamp 3 to be tested for the centering of its filament 4. Near the left end of the base is mounted a housing 5, which is clamped thereto in any suitable way as by means of screws 6 passing through ears projecting out from the bottom of the housing. On its upper end the housing 5 carries a circular plate 7 of a suitable translucent material, as for instance, a glass treated to give it the required translucency, and within the housing is an inclined mirror 9 mounted upon a suitable standard. In the operation of the device the filament 4 may be lighted up as by means of current supplied through conductors 8 and the image of the filament 4 is thrown upon the glass screen 7 as a field by means of the inclined mirror 9. The apparatus is so adjusted that the image of the filament must fall within a predetermined range on the screen 7 in order that the lamp come within the requirements as to positioning of the filament. For convenience the screen 7 has marked thereon a rectangle 10 within which the image of the filament or a portion thereof must fall in order that the lamp may pass inspection. The socket or receptacle 2 is adjustable in a vertical direction to accommodate the apparatus to various sizes and types of lamps and is also adjustable in all directions in a horizontal plane for accurately alining up the apparatus for the particular lamps to be tested. For instance, the socket 2 is vertically adjustable in a cylindrical sleeve 11, the socket being securely clamped therein in any position by means of a set screw 12 passing through the sleeve and frictionally engaging the exterior of the socket 2. The socket 2 is calibrated and the divisions numbered as indicated to indicate the different vertical positions for the various types of lamps to be tested. The sleeve 11 forms a part of a horizontally disposed bar 13 which rests on the base 1 and this bar 13 is adjustable in a horizontal plane by means of releasable clamps 14. The clamps 14 are secured to the base 1 by screws 15, which screws 15 pass through large circular apertures in the bar 13, the play between the screws 15 and walls of the apertures providing for the adjustment of the socket 2 in the horizontal plane. It is to be noted that the conductors 8 are mounted upon spring pressed plungers suitably carried by insulated supports as shown, the plungers serving as contacts to engage the contacts on the base of the lamp 3. As illustrated in the drawing, the lamp 3 is provided with a double contact base and the contact plungers are urged upwardly into contact with the base by springs 16. The housing 5 has an opening in alinement with the mirror 9 and the filament 4 adapted to receive a suitable lens 17, a cap 18 being adapted to be screwed into said opening and clamp the lens 17 against the walls thereof.

While the arrangement of lighting up the lamps to be tested may be resorted to as illustrated, the preferred arrangement is to provide an auxiliary lamp for projecting the image of the filament 4 upon the screen 7. For this purpose an auxiliary lamp 19 and socket 20 are mounted within a housing 21 on the right hand end of the base 1. The housing 21 is conveniently made in two separate parts, the left hand part consisting of an upright standard suitably secured to the base 1 as by means of screw bolts illustrated and the right hand part consisting of the housing proper which fits over the lamp 19 and is clamped to the standard by bolts 22. The standard carries an alinement with the filament 4, lens 17, and mirror 9, suitable condensing lenses 23 mounted in an opening thereof and spaced apart by a spacing ring 24, the lenses 23 and spacing ring 24 being securely held in operative position by a screw cap 25, which is adapted to be screwed into the wall of the opening in the standard. The casing 21 has a ventilating opening in the top thereof over which is secured and spaced therefrom a cover 26. The socket 20 is adjustable in a horizontal plane in a manner similar to the adjustment of the socket 2 above described, as is illustrated in dotted lines in Fig. 1, and suitable leads 27 are illustrated as leading up to the socket 20 and lamp 19 for the purpose of supplying energizing current thereto.

In the operation of the preferred arrangement the operator continues to burn the lamp 19 and simply inserts the lamps 3 to be tested, one after the other, into the socket 2 without connecting the conductors 8 into circuit, the lamp 19 through the arrangement shown, projecting the image of the filament 4 upon the screen 7.

What I claim as new and desire to secure by Letters Patent of the United States, is:—

1. An apparatus for testing the position of filaments in electric lamps, comprising a receptacle for a lamp to be tested, a lens system, an auxiliary source of light in alinement with the filament of the lamp to be tested and in the optical axis of the system and a screen in a position to receive an image of the filament of the lamp to be tested, said receptacle being provided with an adjustable socket for receiving said lamp.

2. An apparatus comprising a receptacle for a lamp, a lens system, an auxiliary source of light in alinement with the filament of the lamp and in the optical axis of the system and a screen in a position to receive an image of the filament of the lamp, said receptacle being provided with an adjustable socket for receiving said lamp.

3. A device comprising a base member, means thereon for movably positioning the light source, an indicating device comprising a screen of ground glass or the like, a lens associated therewith, and a lamp for projecting the image of the said light source through the said lens and upon the said screen.

4. A device comprising a base member, means thereon for movably positioning the light source, an indicating device comprising a housing inclosing a condensing lens and a screen of ground glass or the like provided with indicating markings, and a lamp adapted to project the image of the said light source through the said lens and upon the said screen.

In witness whereof, I have hereunto set my hand this 19th day of January, 1917.

RALPH BEMAN.